United States Patent
Kang

(10) Patent No.: US 7,596,172 B2
(45) Date of Patent: Sep. 29, 2009

(54) RAKE RECEIVER IN MOBILE COMMUNICATION SYSTEM AND CONTROL METHOD THEREFOR

(75) Inventor: Myeong-Ae Kang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 647 days.

(21) Appl. No.: 10/849,844

(22) Filed: May 21, 2004

(65) Prior Publication Data
US 2004/0233977 A1    Nov. 25, 2004

(30) Foreign Application Priority Data
May 23, 2003    (KR) ............................... 32944/2003

(51) Int. Cl.
*H04B 1/707* (2006.01)
(52) U.S. Cl. .................................................... 375/148
(58) Field of Classification Search ................ 375/148, 375/267, 347, 349; 455/132, 101
See application file for complete search history.

(56) References Cited

U.S. PATENT DOCUMENTS 6,269,075 B1 *   7/2001  Tran ........................... 370/206
6,408,039 B1 *   6/2002  Ito ............................... 375/347
2001/0036222 A1* 11/2001  Doetsch et al. ............. 375/148
2003/0007548 A1*  1/2003  Nagano ....................... 375/148
2003/0235239 A1* 12/2003  Li et al. ....................... 375/148

FOREIGN PATENT DOCUMENTS

JP          2000174729 A  *  6/2000

* cited by examiner

*Primary Examiner*—David C Payne
*Assistant Examiner*—Leon Flores
(74) *Attorney, Agent, or Firm*—Roylance, Abrams, Berdo & Goodman, LLP

(57) ABSTRACT

Disclosed is a rake receiver in a mobile communication system and a control method therefor which receives signals transmitted from a base transceiver subsystem through multiple paths. The rake receiver comprises a plurality of fingers for independently demodulating multipath signals when a signal is received through multiple paths; a searcher for checking intensity levels of received signals, detecting valid paths through which signals having intensity levels above a predetermined level are received, and outputting information about the valid paths; and a controller for selecting and enabling fingers corresponding to the valid paths and transmitting signals received through corresponding paths to the enabled fingers in accordance with the information about the valid paths output from the searcher, and if information about at least one new valid path is received from the searcher, selecting and enabling fingers corresponding to the new valid paths and simultaneously providing position information.

6 Claims, 7 Drawing Sheets

RAKE RECEIVER IN MOBILE COMMUNICATION SYSTEM AND CONTROL METHOD THEREFOR

PRIORITY

This application claims the benefit under 35 U.S.C. § 119 (a) of an application entitled "Rake Receiver in Mobile Communication System and Control Method Thereof" filed in the Korean Industrial Property Office on May 23, 2003 and assigned Ser. No. 2003-32944, the entire contents of which are incorporated herein by reference.

BACKGROUND OF THE INVENTION

1. Field of the Invention

The present invention relates to a rake receiver in a mobile communication system and a control method thereof. More particularly, the present invention relates to a rake receiver and a control method thereof for reducing power consumption of a portable terminal.

2. Description of the Related Art

A receiver in a mobile communication system performs communications in a wireless environment, and thus the communication quality thereof is liable to deteriorate in comparison to wire based communications. The most influential factor that affects transmission quality when communications are performed using electromagnetic waves in a wireless environment is fading due to multipath. Multipath Fading due to the phase differences between signals which reach the receiver through different paths, i.e., a difference in time delay. Multipath fading reduces the strength of the signal, causing transmission errors, and the time delay causes interference.

A Code Division Multiple Access (CDMA) communication system using a band spread communication technique solves problems caused by signal multipath by using a rake receiver. The rake receiver is a receiver which separates and demodulates two input signals having a time difference between them, and thus obtains time diversity by recognizing the two input signals, which have a time difference or which are different from each other, as independent signals.

The construction and operation of a conventional rake receiver will now be explained with reference to FIGS. 1 to 4.

FIG. 1 is a block diagram of a conventional rake receiver.

As described, the same signal may be transmitted through two or more transmission paths due to the wireless environment in a mobile communication system. Accordingly, as shown in FIG. 1, analog signals received through receiving paths $100_1 \ldots 100_M$ (hereinafter referred to as receiving paths 100) are converted into baseband digital signals by an analog-to-digital converter (ADC) 110, and the baseband digital signals are respectively input to a searcher 120 and a controller 130. The searcher 120 checks intensity levels of the signals received through the respective paths, detects valid paths through which signals having intensities above a predetermined level are received, and informs the controller 130 and a finger unit 140 of the detection. Meanwhile, the controller 130 receives information about the valid paths and information about fingers which will be allocated with the valid paths from the searcher 120, and transmits to the finger unit 140 the signals received from the valid paths among the receiving paths 100 from the ADC 110 and an enable command signal so that the received signals can be demodulated. The finger unit 140 estimates the original signals received through the valid paths, and sends the estimated original signals to a combiner 150, and the combiner 150 combines the received original signals to estimate the original signal received through the several receiving paths.

FIG. 2 is a block diagram illustrating an inner construction of the finger unit of the conventional rake receiver.

As shown in FIG. 2, timing controllers 141 generate control signals according to the control signal from the controller 130, transmit the generated control signals to pseudo noise (PN) position calculators 142 and PN sequence generators 143, and detect time delays of the signals received from the controller 130. The PN sequence generators 143 are initialized simultaneously with the searcher 120 by initialization signals input from the timing controllers 141. The initialized PN sequence generators 143 of respective fingers 140-1 to 140-F move sequences to positions of allocated PN sequences of demodulation paths, which are designated by the searchers, through slewing, and restore the spread signals to their despread state using the time delay information detected by the timing controller.

Hereinafter, the operation of the rake receiver as constructed above will be explained with reference to FIGS. 1 to 3. FIG. 3 is a flowchart illustrating the operation of the conventional rake receiver.

If the searcher 120 and the finger unit 140 are enabled at step 200, the searcher 120 and the PN sequence generators 143 of the finger unit 140 are simultaneously initialized at step 210. In this case, the generation of the PN sequences is implemented by shift registers, and the initialization means that the searcher 120 and the PN sequence generators 143 of the respective fingers initialize the shift registers to their initial PN sequence states at an appointed time. The PN positions at this time are set to '0'. For example, in the case of $3^{rd}$ Generation Partnership Project 2 (3GPP2), the PN positions refer to positions where '1' appears after 14 '0' sequences.

The searcher 120 searches the PN positions of the valid paths based on the highest energy level detected at step 220. The searcher 120 allocates the PN positions of the valid paths obtained at step 220 to fingers selected among a plurality of fingers 140 at step 230, and releases other fingers.

However, since it is essential to reduce the power consumption in small-sized appliances such as portable terminals, the power supply to the fingers, which have been released and are temporarily not in use according to the change in environment, should be intercepted, or the system clock should be completely gate-off.

Steps 240 to 280 refer to a process of performing a gate-off of idle fingers through the controller 130. The controller 130 sets the finger having the number f (i.e., finger #f) to '1' at step 240. The controller 130 determines whether the finger #f exists in hardware at step 250. If the finger #f exists in hardware as a result of the determination at step 250, the controller 130 determines whether the finger #f is allocated to the PN position of the valid path at step 260. If the finger #f is not allocated to the PN position of the valid path as a result of the determination at step 260, the controller 130 disables functions of the finger #f except for the PN sequence generator 143 at step 270. If the finger #f is allocated to the PN position of the valid path as a result of the determination at step 260, the functions of the finger should be kept in an enable state, and thus the controller 130 increases the finger number by '1' at step 280, and returns to step 250. If the steps 250 to 280 are performed as many times as the number of fingers which exist in the finger unit, the controller returns to step 220.

In the PN position as described above, the finger achieves fine timing in a chip using an internal time tracker, and if the designated path moves according to time, it tracks the path. The PN sequences are updated at predetermined rates, and the phases of the sequences are adjusted by adjusting update rates of shift registers according to a command for slewing to the allocated position according to the operation of the searcher 120. FIG. 4 illustrates the phase changes of the sequences according to the update-rate adjustment performed by the respective fingers.

In FIG. 4, fingers 1 to 4 are fingers the PN positions of which are set to '0' at a time t0 as described in step 210. If there is no PN position movement according to the slewing command or the operational result of the timing controller 141, the PN sequences are updated at the predetermined rates, and at this time, there is no change of the PN position. That is, referring to the finger 2, the PN sequences 0, 1 and 2 are updated at the predetermined rates, and the corresponding PN positions are set to '0', causing no change. However, if the update rate of the PN sequence is adjusted and the PN sequence 3 is not updated to the PN sequence 4 at a time t1, the PN position is corrected to '1', and is shifted as much as the time error first measured by the time tracker. In this case, the PN position is moved in the unit of a ½ chip until the PN sequence is updated to the PN sequence 4 at a time t2.

In contrast, the finger 4' in FIG. 4 is a finger to which the PN position is not allocated at step 230, and all functions of the finger 4' including the PN sequence generator 143 are disabled at step 270. That is, the finger 4' has not been initialized with the searcher 120 at the time t0, and thus has not generated the PN sequence. However, the PN position of the finger 4' cannot be known at a time t3 when the PN position is allocated to the finger 4' due to the increase of the valid paths allocated to the finger. In other words, an error occurs in symbol demodulation when the power supply to the respective finger is intercepted or the applied system clock is completely gate-off, and a new path is allocated thereto by the searcher, and this affects the performance of the receiver. In order to overcome this, the PN sequence generators 143 and control units of the respective fingers, which may be used at any time, should always be in a power supply state and in an enable state, respectively.

SUMMARY OF THE INVENTION

Accordingly, an object of the present invention is to provide a rake receiver in a mobile communication system and a control method thereof which can reduce power consumption of a portable terminal.

Another object of the present invention is to provide a rake receiver in a mobile communication system and a control method thereof which can turn fingers on and off.

Still another object of the present invention is to provide a rake receiver in a mobile communication system and a control method thereof which can provide enable information when power is supplied to fingers.

In order to accomplish these objects, a rake receiver of a mobile communication system is provided. The rake receiver comprises a plurality of fingers for independently demodulating multiple path signals when a signal is received through multiple paths; a searcher for checking intensity levels of received signals, detecting valid paths through which signals having intensity levels above a predetermined level are received, and outputting information about the valid paths; and a controller for selecting and enabling fingers corresponding to the valid paths and transmitting signals received through corresponding paths to the enabled fingers in accordance with the information about the valid paths output from the searcher, and if information about at least one new valid path is received from the searcher, selecting and enabling fingers corresponding to the new valid paths and simultaneously providing position information.

In accordance with another aspect of the present invention, a control method is provided for a rake receiver in a mobile communication system having a plurality of fingers which independently demodulate multiple path signals when a signal is received through multiple paths. The control method comprises a first step of checking intensity levels of received signals, and detecting valid paths through which signals having intensity levels above a predetermined level are received, a second step of selecting and enabling fingers corresponding to the valid paths, and transmitting signals received through the corresponding paths to the enabled fingers, and a third step of, if at least one new valid path is detected, selecting and enabling fingers corresponding to the new valid paths and simultaneously providing position information.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a rake receiver in a mobile communication system and a control method thereof according to a preferred embodiment of the present invention will be described with reference to the accompanying drawings. In the following description of the present invention, a detailed description of known functions and configurations incorporated herein will be omitted for conciseness.

Figure 1:
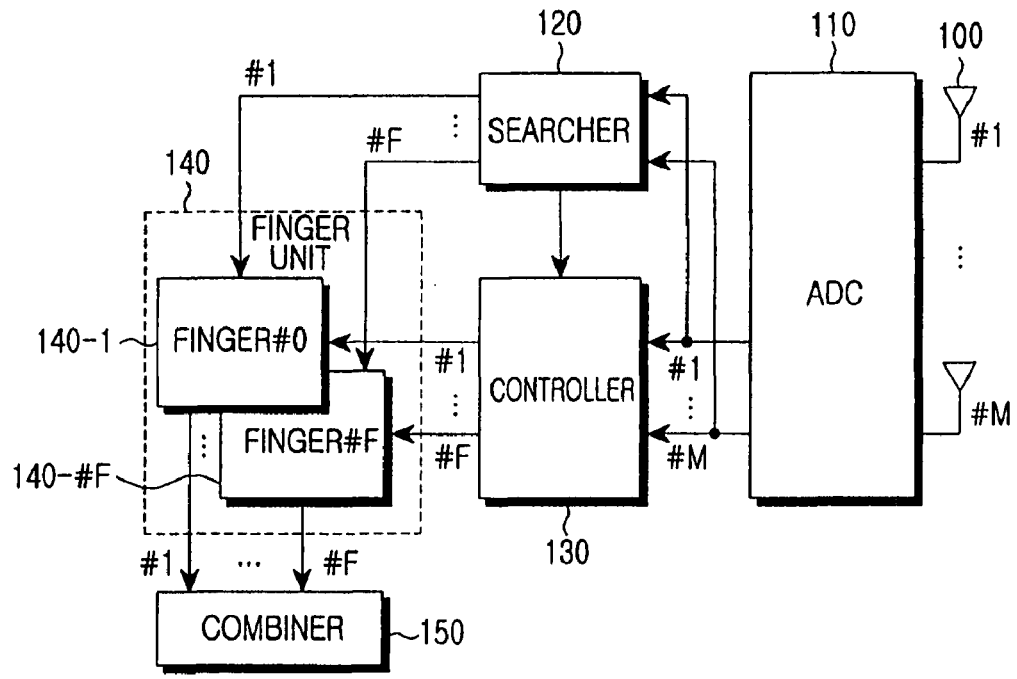
FIG. 1 is a block diagram of a conventional rake receiver.
Figure 2:
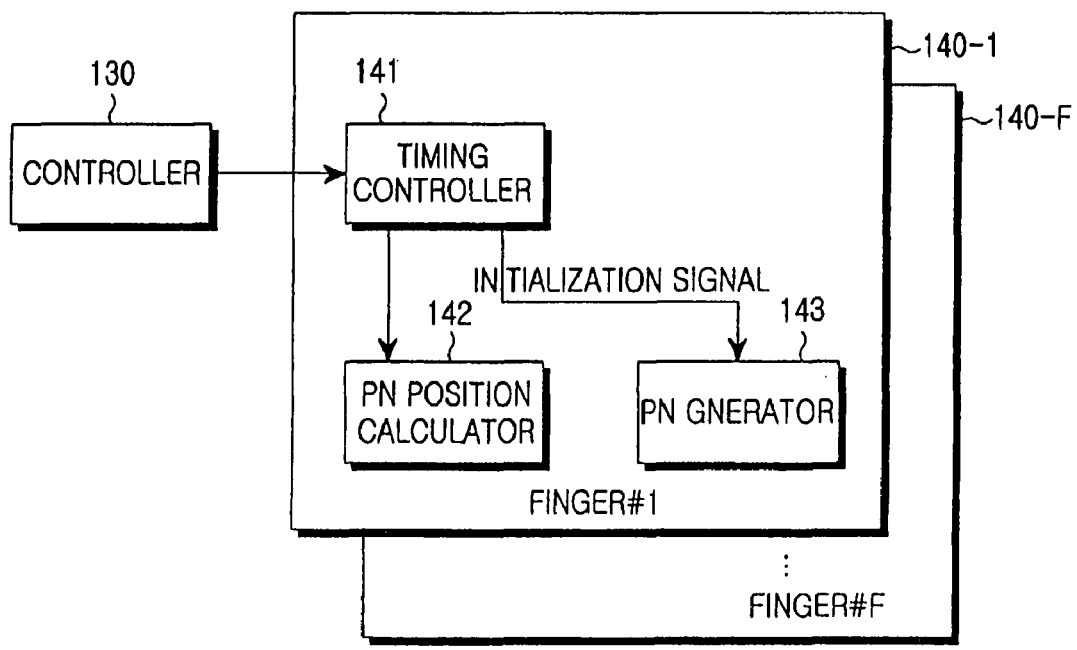
FIG. 2 is a block diagram illustrating the inner construction of a finger unit of a conventional rake receiver.
Figure 3:
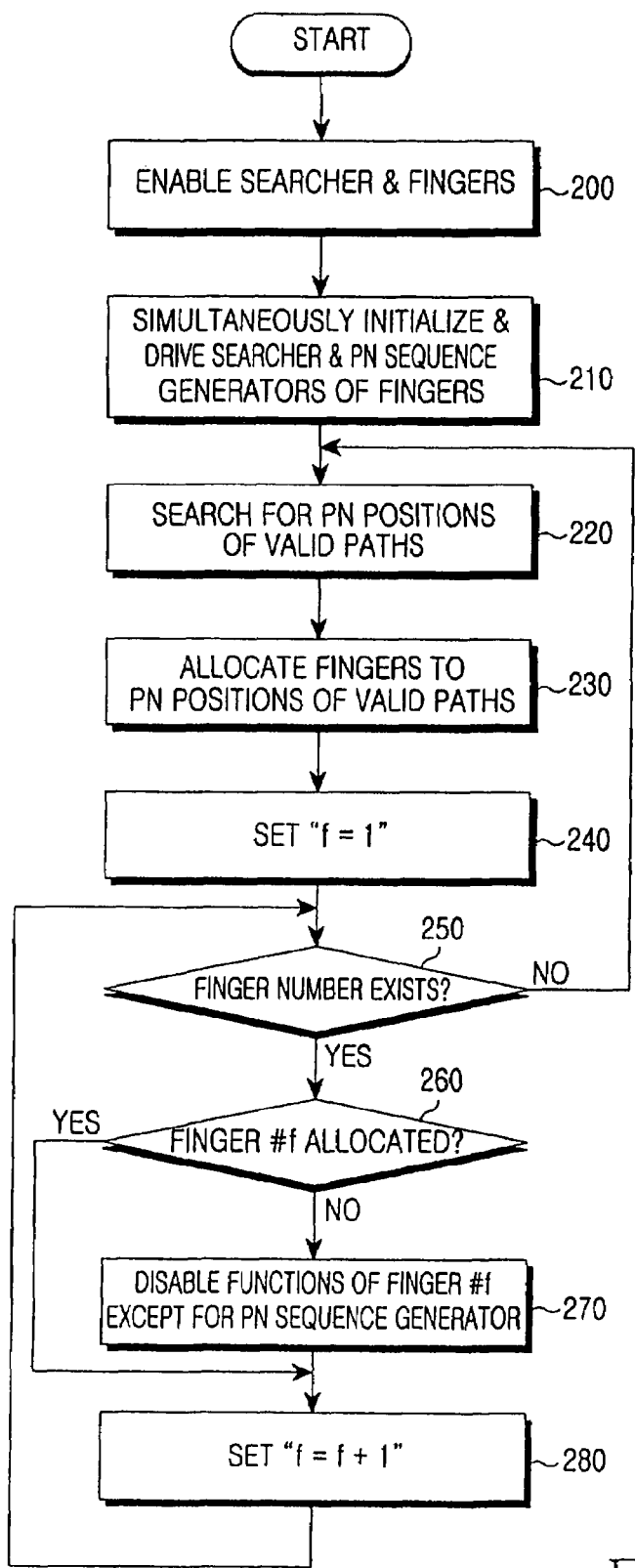
FIG. 3 is a flowchart illustrating the operation of the conventional rake receiver.
Figure 4:
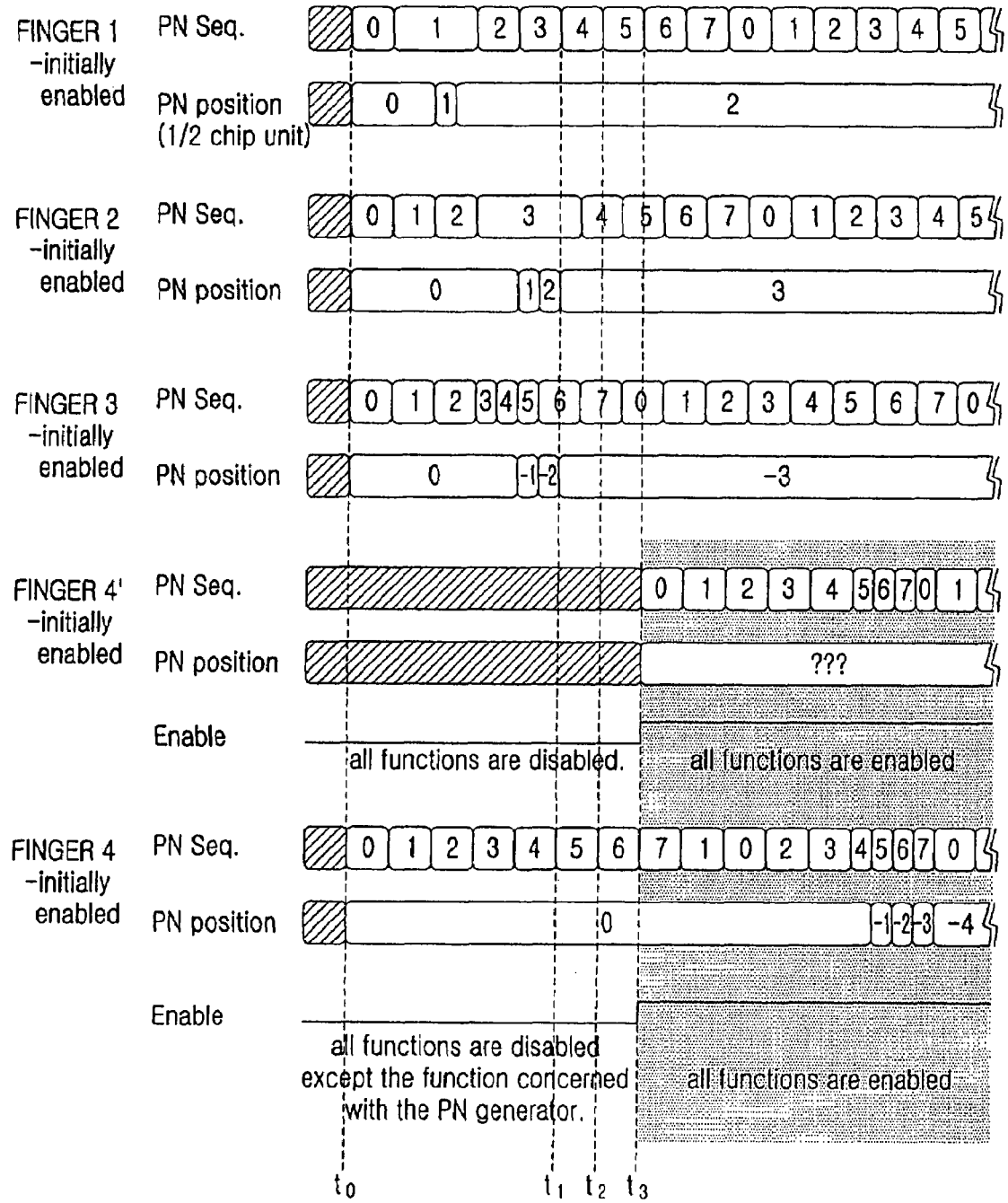
FIG. 4 is a view illustrating a change of pseudo noise (PN) sequences and PN positions in the finger unit of a conventional rake receiver.
Figure 5:
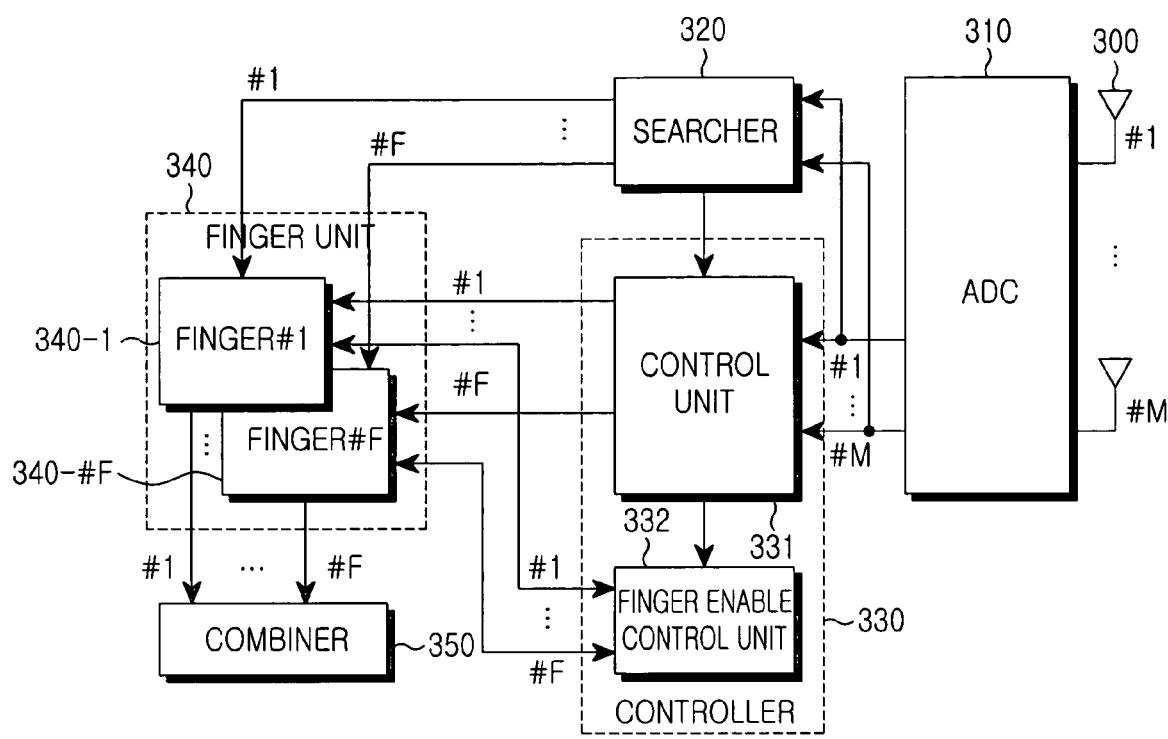
FIG. 5 is a block diagram of a rake receiver according to an embodiment of the present invention.

FIG. 5 is a block diagram of a rake receiver according to an embodiment of the present invention.

Referring to FIG. 5, analog signals received through M receiving paths 300 are converted into baseband digital signals by an analog to digital converter (ADC) 310. The baseband digital signals are respectively input to a searcher 320 and a controller 330. The searcher 320 checks intensity levels of the signals received through the respective paths, detects valid paths through which signals having intensity levels above a predetermined level are received, and informs the controller 330 and a finger unit 340 of the result of the detection.

The controller 330 comprises a control unit 331 and a finger enable control unit 332. The control unit 331 transmits the signals received through the M receiving paths 300 from the ADC 310 and corresponding command signals to the finger unit 340 according to information received from the searcher 320. The controller 330 also designates a reference finger and transmits the designated reference finger signal and information about target fingers newly allocated by the searcher 320 to the finger enable control unit 332 in accordance with new valid paths and resultant signals of a pseudo noise (PN) position search from the searcher 320. In the case of enabling the fingers newly allocated after the initialization of the searcher 320 according to the control signal from the control unit 331, the finger enable control unit 332 reads sequence timing information and a sequence position of the finger which has been designated as the reference finger among the previously allocated fingers, and provides the sequence timing information and the sequence position of the reference finger to the newly allocated fingers. The finger unit 340 estimates the original signals of the signals received through the valid paths, and sends the estimated original signals to a combiner 350, and the combiner 350 combines the received original signals to estimate the original signal received through the several receiving paths.

Figure 6:
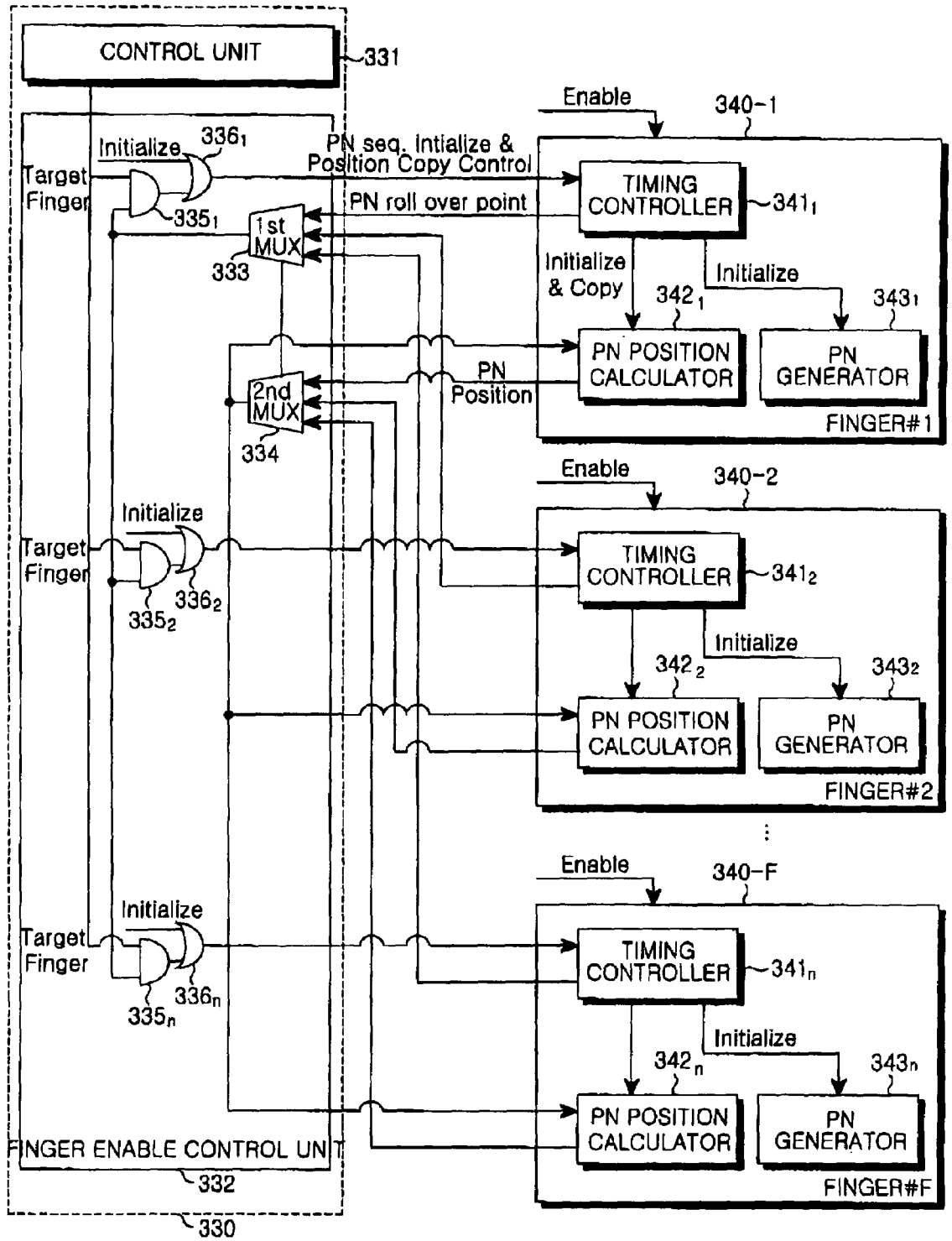
FIG. 6 is a detailed circuit diagram of a rake receiver according to an embodiment of the present invention.

FIG. 6 is a detailed circuit diagram of a rake receiver according to an embodiment of the present invention.

Referring to FIG. 6, the finger enable control unit 332 may include two multiplexers (MUX) 333 and 334 and a plurality of AND gates $335_1, 335_2 \ldots 335_n$ (hereinafter referred to as AND gates 335) and OR gates $336_1, 336_2 \ldots 336_n$ (hereinafter referred to as OR gates 336). However, it should be noted that FIG. 6 illustrates only one example of the circuit construction of the finger enable control unit 332, and diverse circuit constructions having the function of the finger enable control unit 332 are included in the scope of the present invention.

The first MUX 333 in FIG. 6 receives PN rollover points where the PN sequence number becomes '0' from the timing controllers 341 of all of the fingers, and outputs only the PN rollover point corresponding to the reference finger information output from the control unit 331. The AND gates 335 corresponding to the respective fingers AND-gate the PN rollover point output from the first MUX 333 and information about the existence or nonexistence of a target finger output from the control unit 331. The OR gates 336 OR-gate output values of the AND gates 335 and initialization signals, and output resultant values to the corresponding fingers, respectively. The second MUX 334 receives the PN positions from the respective fingers, and outputs only the PN position corresponding to the reference finger to respective PN position calculators 342.

Figure 8:
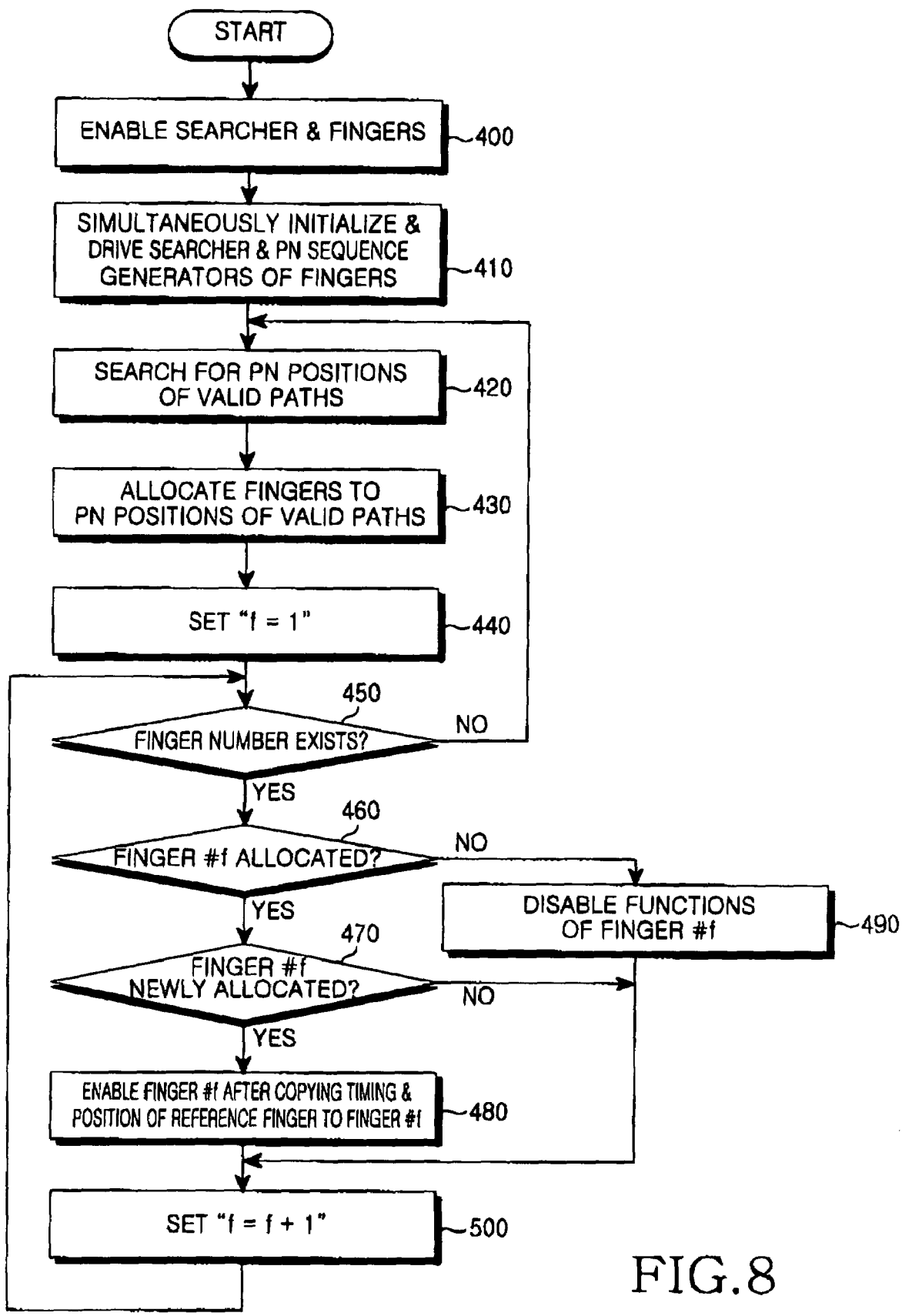
FIG. 8 is a flowchart illustrating the operation of a rake receiver according to an embodiment of the present invention.

FIG. 8 is a flowchart illustrating the operation of the rake receiver according to an embodiment of the present invention.

Referring to FIGS. 5 to 8, if the searcher 320 and the finger unit 340 are enabled at step 400, the searcher 320 and the PN sequence generators 343 of the finger unit 340 are simultaneously initialized at step 410. In this case, the generation of the PN sequences is implemented by shift registers, and the initialization means that the searcher 320 and the PN sequence generators 343 of the respective fingers initialize the shift registers to their initial PN sequence states at an appointed time. The PN positions at this time are set to '0'. For example, in the case of 3GPP2, the PN positions refer to positions where '1' appears after 14 '0' sequences.

Figure 7:
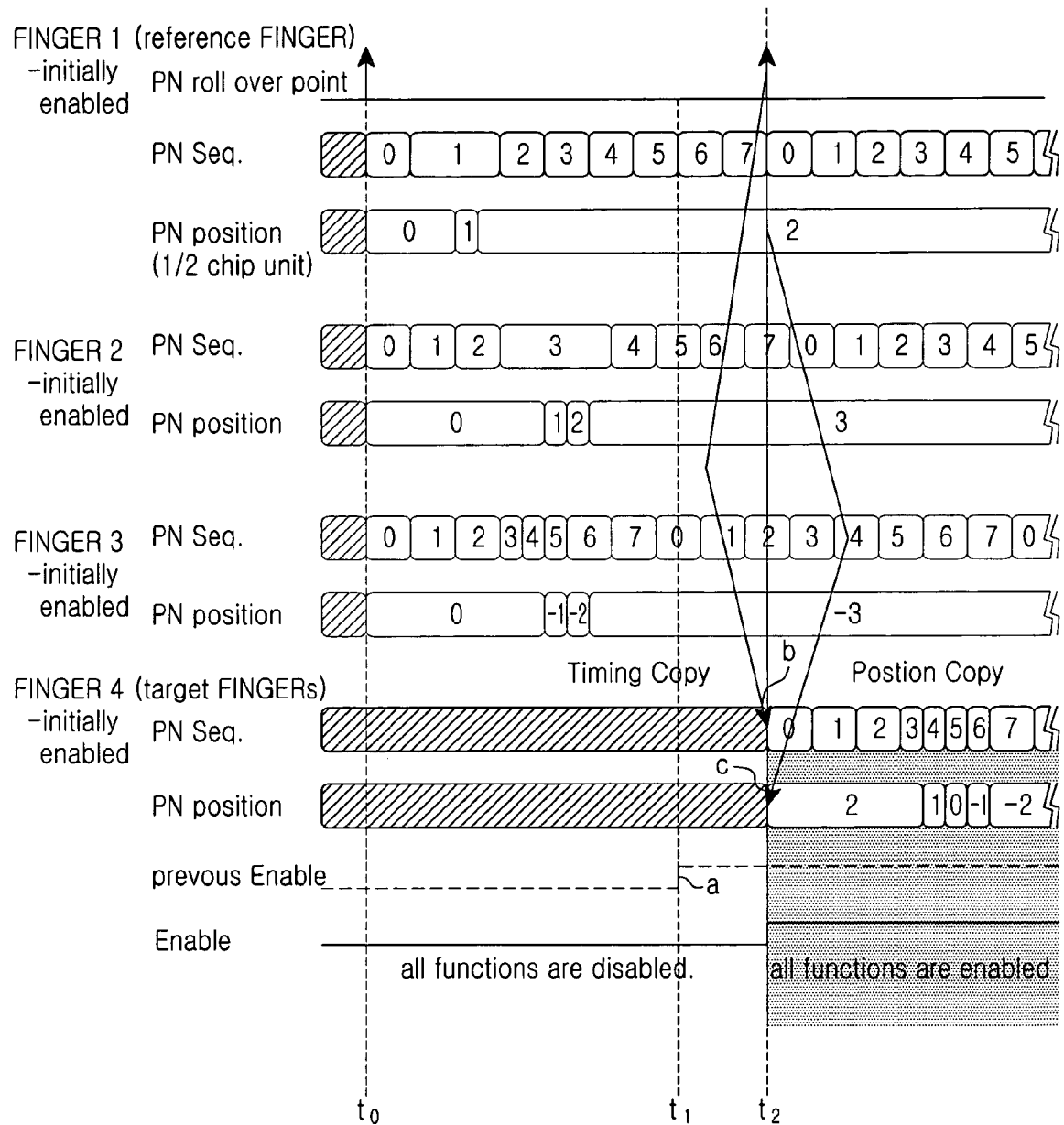
FIG. 7 is a view illustrating the change of PN sequences and PN positions in respective fingers of a rake receiver according to an embodiment of the present invention.

FIG. 7 is a view illustrating the change of PN sequences and PN positions in respective fingers of a rake receiver according to an embodiment of the present invention. In FIG. 7, fingers 1, 2 and 3 are initialized by the searcher 320, and are allocated with the PN position '0' at a PN rollover point (t0) when the PN sequences are initialized. Functions of the all fingers except for the reference finger can be disabled by a software command when the fingers are not used, and the following steps are performed to provide available timing information and PN position information when the disabled fingers are enabled.

The searcher 320 searches the PN positions of the valid paths using the highest energy level at step 420. The searcher 320 allocates the PN positions of the valid paths obtained at step 420 to fingers selected among a plurality of fingers 340-1 to 340-F at step 430, and releases other fingers.

The control unit 331 sets the finger number f (i.e., finger #f) to '1' at step 440. The controller 330 determines whether the finger #f is a finger number that exists in hardware at step 450. If the finger #f is the finger number that exists in hardware as a result of judgment at step 450, the controller 330 determines whether the finger #f is allocated to the PN position of the valid path at step 460. If the finger #f is allocated to the PN position of the valid path as a result of judgment at step 460, the controller 330 determines whether the finger #f is a newly allocated finger, not the finger allocated during the initialization of the searcher, at step 470. If the finger #f is the newly allocated finger as a result of the determination at step 470, the control unit 331 outputs reference finger information and a target finger enable signal to the finger enable control unit 332 so as to support the finger enable control unit 332 so that the finger enable control unit 332 enables the finger #f after copying the timing and the PN position of the reference finger.

Now, the step 480 will be explained in detail with reference to FIGS. 6 to 8.

The control unit 331 inputs an enable signal to the corresponding target fingers, which may be plural, and outputs signals for determining the target fingers and the reference finger to the finger enable control unit 332. The first MUX 333 of the finger enable control unit 332 receives the PN rollover point signal from the timing controllers of all of the fingers, and outputs only the PN rollover point of the reference finger to the AND gate 335 that corresponds to all of the fingers. Accordingly, the enable signal output from the control unit 331 is input only to the AND gate 335 that corresponds to the finger determined as the target finger, and thus a PN sequence signal and a position copy control signal are output to the timing controller of the target finger.

Meanwhile, the second MUX 334 of the finger enable control unit 332 receives PN positions from the respective fingers, and outputs only the PN position corresponding to the reference finger to respective PN position calculators. Accordingly, the timing controller 341 of the target finger, to which the PN sequence initialization signal and the position copy control signal have been input, outputs the initialization and PN position copy control signals to the PN position calculator 342, so that the PN position calculator 342 is initialized by the PN position information output from the finger enable control unit 332.

The PN generator 343 is initialized according to the initialization command input from the finger enable control unit 340. That is, referring to FIG. 8, if the enable signal is input from the control unit 331 at a time t1, the PN sequence is initialized to '0'(b) to match the PN rollover point (t2) of the reference finger after the time t1, and the PN position is set to '2'(c) that is the PN position of the finger 1. Accordingly, as the PN sequence generator of the target finger moves the sequences to the allocated positions, the PN position calculator calculates the position according to the amount of change. As described above, the timing and the position of the reference finger are directly copied to as those of the target finger, but the position may be initialized by moving the target finger to a position corresponding to the designated value of the reference finger and adding or subtracting the designated value to or from the position of the reference finger.

If the finger #f is not allocated to the PN position of the valid path as a result of the determination at step 460, the control unit 331 disables the functions of the finger #f except for the PN sequence generator 343 at step 470, and then performs step 500. Even if the finger #f is not newly allocated to the PN position of the valid path as a result of the determination at step 470, the control unit 331 performs step 500. At step 500, the controller increases the finger number #f by '1', and then returns to step 450. If steps 450 to 480 are performed a number of times which is the same as the number of fingers which exist in the finger unit, the control unit returns to step 420.

Through the above-described processes, the software can recognize the positions of the PN sequences of the target fingers, and thus can perform the timing control of the target fingers.

As described above, the rake receiver and the control method thereof according an embodiment of the present invention can reduce the power consumption of a portable terminal by intercepting the power or the system clock supplied to all of the hardware of the fingers which are not in use, according to a change in environment, without affecting the performance of the rake receiver.

While the invention has been shown and described with reference to an exemplary embodiment thereof, it will be understood by those skilled in the art that various changes in form and details may be made therein without departing from the spirit and scope of the invention as defined by the appended claims.

What is claimed is:

1. A rake receiver of a mobile communication system, the rake receiver comprising:
    a plurality of fingers for independently demodulating multipath signals when a signal is received through multiple paths;
    a searcher for checking intensity levels of received signals, detecting valid paths through which signals having intensity levels above a predetermined level are received, and outputting information about the valid paths; and
    a controller for selecting and enabling initially allocated fingers corresponding to the valid paths and transmitting signals received through corresponding paths to the enabled fingers in accordance with the information about the valid paths output from the searcher, and when information about at least one new valid path is received from the searcher, selecting and enabling newly allocated fingers corresponding to the new valid paths and simultaneously providing PN position information;
    wherein the controller selects one of the enabled fingers among the initially allocated fingers as a reference finger and reads out the PN position information from the reference finger and outputs the read PN position information from the reference finger to the newly allocated fingers.

2. The rake receiver as claimed in claim 1, wherein the controller reads out the PN position information at a time when a sequence number of the reference finger is initialized.

3. The rake receiver as claimed in claim 2, wherein the controller inputs an initialization signal to the finger which is enabled at the time when the sequence number of the reference finger is initialized.

4. A control method for a rake receiver in a mobile communication system having a plurality of fingers which independently demodulate multipath signals when a signal is received through multiple paths, the control method comprising:
    checking intensity levels of received signals, and detecting valid paths through which signals having intensity levels above a predetermined level are received;
    selecting and enabling initially allocated fingers corresponding to the valid paths, and transmitting signals received through corresponding paths to the enabled fingers; and
    selecting and enabling newly allocated fingers corresponding to the new valid paths and simultaneously providing PN position information when at least one new valid path is detected;
    wherein, in the selecting and enabling step, one of the enabled fingers among the initially allocated fingers is selected as a reference finger and the PN position information is read from the reference finger and is output to the newly allocated fingers.

5. The control method as claimed in claim 4, wherein the PN position information is at a time when a sequence number of the reference finger is initialized.

6. The control method as claimed in claim 5, wherein, in the second step of selecting and enabling, an initialization signal is input to a finger which is enabled at the time when the sequence number of the reference finger is initialized.

* * * * *

UNITED STATES PATENT AND TRADEMARK OFFICE
CERTIFICATE OF CORRECTION

PATENT NO.        : 7,596,172 B2                                              Page 1 of 1
APPLICATION NO.   : 10/849844
DATED             : September 29, 2009
INVENTOR(S)       : Myeong-Ae Kang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1072 days.

Signed and Sealed this

Twenty-eighth Day of September, 2010

David J. Kappos
*Director of the United States Patent and Trademark Office*